United States Patent
Tomasch et al.

[19]

[11] Patent Number: 6,043,842
[45] Date of Patent: Mar. 28, 2000

[54] REMOTE SURVEILLANCE DEVICE

[75] Inventors: Michael D. Tomasch, Massapequa Park, N.Y.; Anthony G. Martin, Trabuco Canyon, Calif.

[73] Assignee: Olympus America Inc., Melville, N.Y.

[21] Appl. No.: 08/775,311

[22] Filed: Dec. 31, 1996

[51] Int. Cl.[7] ..................................... H04N 7/18
[52] U.S. Cl. ..................... 348/164; 348/143; 385/118
[58] Field of Search ..................... 348/164, 143, 348/65, 68; 128/898; 385/118; 73/864.73; H04N 7/18

[56] References Cited

U.S. PATENT DOCUMENTS

| | | |
|---|---|---|
| Re. 33,572 | 4/1991 | Meyers . |
| 4,027,159 | 5/1977 | Bishop . |
| 4,261,204 | 4/1981 | Donaldson ............................ 73/864.73 |
| 4,574,197 | 3/1986 | Kliever . |
| 4,696,544 | 9/1987 | Costella .................................. 385/118 |
| 4,707,595 | 11/1987 | Meyers . |
| 4,998,282 | 3/1991 | Shishido .................................. 381/77 |
| 5,130,527 | 7/1992 | Gramer et al. . |
| 5,215,105 | 6/1993 | Kizelshteyn ............................ 128/898 |

*Primary Examiner*—Howard W. Britton
*Attorney, Agent, or Firm*—Michaelson & Wallace; Peter L. Michaelson; John C. Pokotylo

[57] ABSTRACT

A remote surveillance system including an imaging device and an IR light source for surveying a relatively dark area, a remote surveillance system including an imaging device and an insertion tube guide, and an insertion tube guide for receiving an insertion tube of an imaging device.

47 Claims, 12 Drawing Sheets

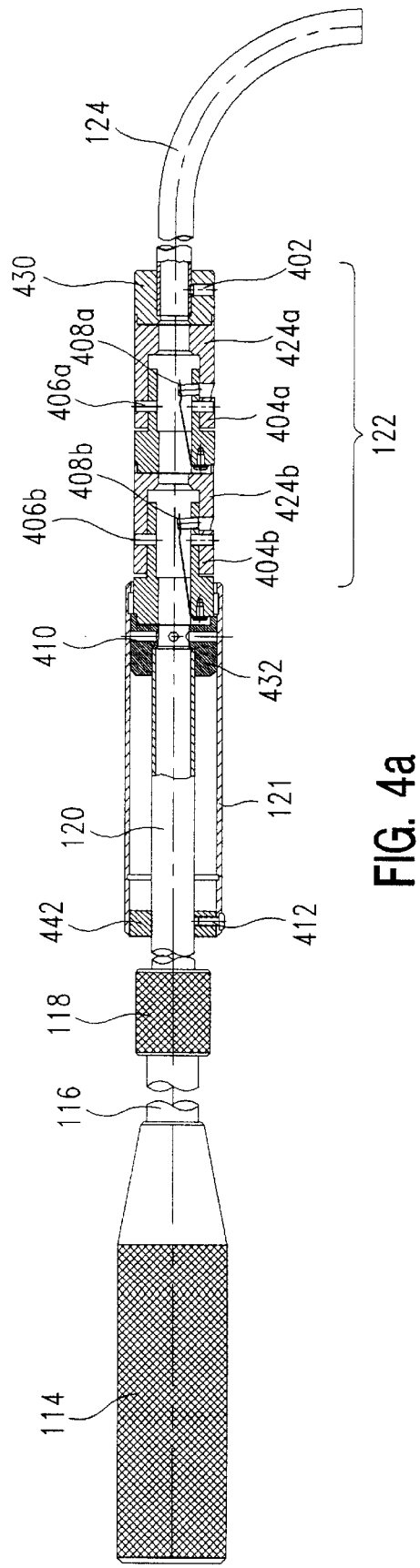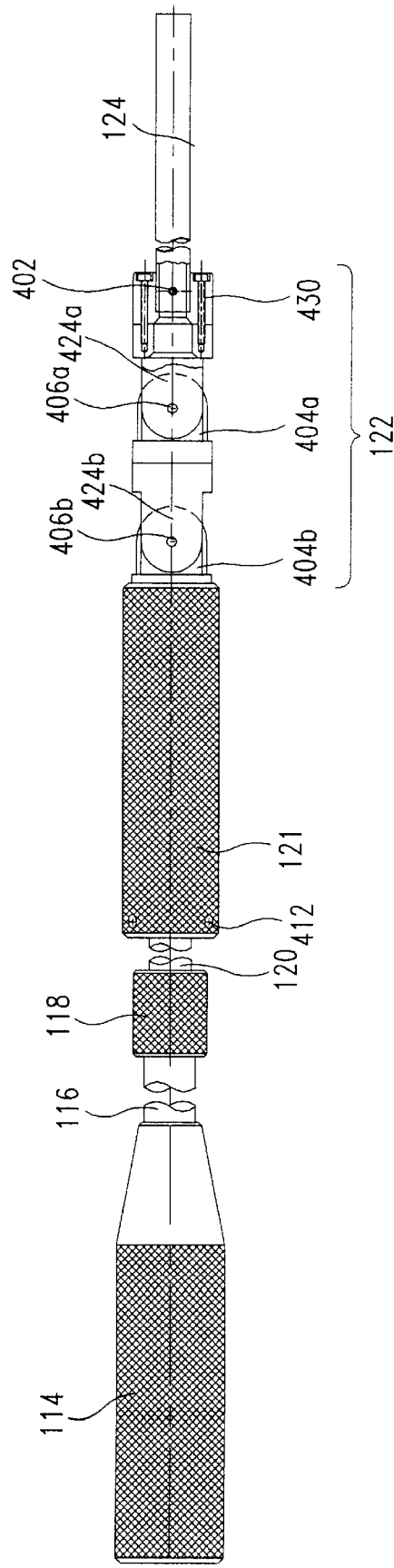
FIG. 4a
FIG. 4b

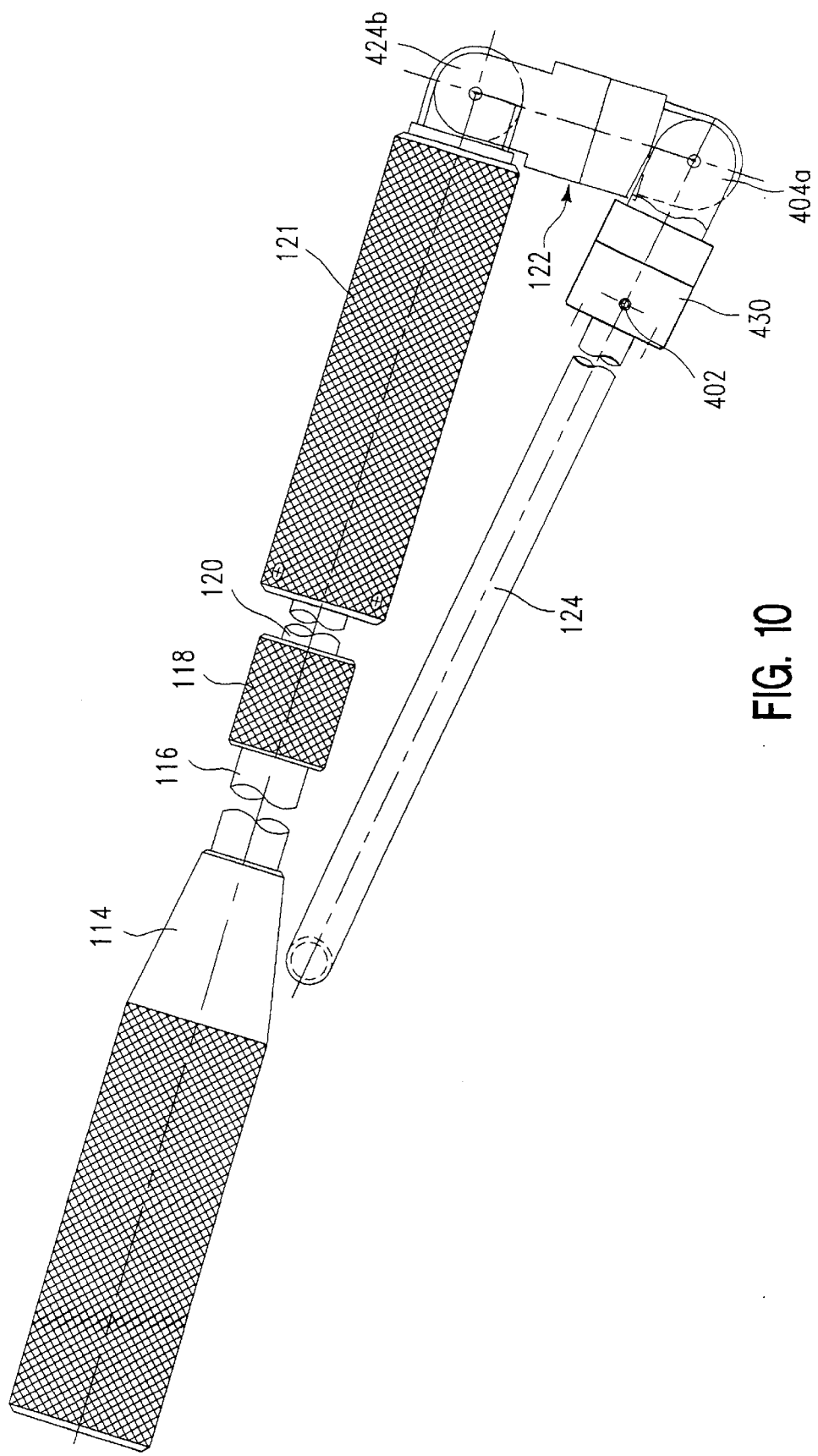

REMOTE SURVEILLANCE DEVICE

BACKGROUND OF THE INVENTION a. Field of the Invention

The present invention concerns remote surveillance, and in particular, concerns a portable device and system for permitting stealthy surveillance of a closed area.

b. Related Art

Military and law enforcement agencies use and rely on surveillance to provide themselves with a tactical advantage during a future encounter with an adversary, or to determine whether or not to engage the adversary at all. The type of surveillance used depends upon many factors, including, for example, conditions and characteristics of the area at which the encounter is to take place.

In many instances, specially trained military units and law enforcement personnel must enter potentially hostile closed areas such as buildings or rooms. For example, special ingress operations may be required in a terrorist-hostage setting or when serving a warrant. Although the use of speed and overwhelming force and numbers often conveys a decisive tactical advantage to law enforcement and military personnel, they (as well as any hostages) are still subject to harm. Thus, surveillance can be used to further reduce the risk of harm to law enforcement and military personnel and/or hostages.

Unfortunately, there is often no way of predicting an area which will be the site of an encounter between law enforcement or military personnel and their adversary. Hence, the means for surveillance should be portable and capable of rapid deployment. If the surveillance means requires assembly, such assembly should be easy, quick, quiet and not require extra tools. To maintain the tactical advantage of surprise, the means for surveillance should permit virtually silent and invisible operation (i.e., have stealthy operation). In the event, however, that the adversary detects the surveillance means, it is advantageous to minimize the exposure of the operator(s) of the surveillance means.

Night vision has been employed by military and law enforcement personnel to provide themselves with a tactical advantage over their adversaries. Some night vision units include an infra-red light source to illuminate the area being observed with radiation that is, visually, almost imperceptible. For example, U.S. Pat. No. 4,707,595, Re. Pat. No. 33,572 and U.S. Pat. No. 5,130,527 discuss night vision systems. Unfortunately, these systems are only useful in instances in which the area to be surveyed is open (i.e., unobstructed). For example, the systems discussed in these patents are not useful for surveying areas behind walls or behind closed doors.

Although some military and law enforcement personal use mirrors to view around obstructions, the use of mirrors often cannot convey a detailed scan of the area to be entered and can betray the position of law enforcement or military personnel to their adversary.

In view of the foregoing, it would be an advance in the art to provide a portable means for stealthy surveillance, particularly of closed areas. Any assembly required for the means for surveillance should be easy, quick, quiet and not require additional tools. Further, the means for surveillance should permit stealthy operation and should permit a thorough scan of the area to be entered. Furthermore, the means for surveillance should minimize the exposure of its operator to danger and should be adjustable for use by operators of various heights. Moreover, the means for surveillance should be operable in harsh environments. Finally, the means for surveillance should permit relatively dark areas to be surveyed.

SUMMARY OF THE INVENTION

The present invention meets the above mentioned needs by providing (a) a remote surveillance system, including an imaging device and an IR light source, for surveying a relatively dark area, and (b) a remote surveillance system including an imaging device and an insertion tube guide.

The remote surveillance system for surveying a relatively dark area includes an imaging device and an IR light source. The imaging device includes a body having a viewing means and an insertion tube. The insertion tube has a proximal end connected to the body and a distal end. The distal end of the insertion tube has an illumination window and means for capturing an image within a field of view. The image captured by the means for capturing is conveyed to the viewing means of the body. The infra-red light source provides infra-red light in response to a user control and is optically coupled with the body of the imaging device. Infra-red light is carried from the proximal end of the insertion tube to the illumination window at the distal end of the insertion tube. An image intensifier (e.g., a night vision unit), optically coupled with the viewing means of the body of the imaging device, may also be provided.

The body of the imaging device may further include articulation controls for articulating the distal end of the insertion tube. The articulation controls preferably control up-down and left-right articulations of the distal end of the insertion tube.

The imaging device is preferably a fiberscope but, alternatively, may be a borescope or a videoimagescope for example.

A pressure sensitive switch, providing an output to the infra-red light source, may also be provided. In this case, the user control is based, at least in part, on a state of the pressure sensitive switch. The pressure sensitive switch is preferably provided on the body of the imaging device.

The infra-red light source preferably includes a removable power supply, an on-off switch, and an infra-red light emitting diode. In this case, the user control is based, at least in part, on a state of the on-off switch. Further, the infra-red light emitting diode provides the infra-red light in response to the user control. The removable power supply preferably includes at least one DC battery.

In an embodiment including both an on-off switch and a pressure sensitive switch, the user control is based on a state of the pressure sensitive switch and a state of the on-off switch. In a preferred embodiment, the infra-red light source only provides infra-red light when both the on-off switch and the pressure sensitive switch are closed. The infra-red light source may further include an indicator light having a first on state and a second on state. The indicator light enters the first on state when the on-off switch is closed but the pressure sensitive switch is open, and enters the second on state when both the on-off switch and the pressure sensitive switch are closed.

A foam grip may be provided on the body of the imaging device such that the pressure sensitive switch is arranged between a portion of the foam grip and the body of the imaging device.

The present invention also discloses a remote surveillance system having an imaging device and an insertion tube guide. The imaging device has a body and an insertion tube.

The body has a viewing means. The insertion tube has a proximal end connected to the body and a distal end. The distal end of the insertion tube has means for capturing an image within a field of view. The image captured by the means for capturing is conveyed to the viewing means of the body. The insertion tube guide includes a straight section and a curved section. The straight section has an entrance port for receiving the insertion tube of the imaging device. The curved section is coupled (either directly or pivotally) with the straight section and has an exit port through which a distal end of the insertion tube exits.

The straight section of the insertion tube guide may include a fitting for receiving a portion of the body of the imaging device, an upper section coupled with the fitting, and a lower section which can telescope with respect to the upper section. The straight section of the insertion tube guide may further include a length adjustment ring for enabling and disabling the telescoping between the upper and lower sections. The fitting of the straight section of the insertion tube guide and the body of the imaging device may include means for preventing relative radial movement between the imaging device and the insertion tube guide.

The curved section of the insertion tube guide may be provided with means for deadening noise. The distal end of the insertion tube and the insertion tube guide may be black.

An image intensifier (e.g., a night vision unit) may be optically coupled with the viewing means of the body.

The body of the imaging device may further include articulation controls for articulating the distal end of the insertion tube. The articulation controls may control up-down and left-right articulations of the distal end of the insertion tube. The imaging device may be a fiberscope or a videoimagescope for example.

This remote surveillance system may further include an infra-red light source, a pressure sensitive switch, an a foam grip like the ones discussed above If the straight and curved sections of the insertion tube guide are pivotally coupled, a hinged section is provided there between. The hinged section may include means for limiting, when the insertion tube is inserted therethrough, the pivoting of the straight section with respect to the curved section. The hinged section may include (a) a first spaced clevis pair, coupled with the straight section of the insertion tube guide, (b) a member including a second spaced clevis pair, pivotally coupled with the first spaced clevis pair, and a third spaced clevis pair, coupled with the second spaced clevis pair, and (c) a fourth spaced clevis pair, pivotally coupled with the third spaced clevis pair, and coupled with the curved section of the insertion tube guide. Each of the first, second, third, and fourth spaced clevis pairs are spaced such that the insertion tube of the imaging device can pass therethrough. The insertion tube guide may further include a slideable hinge lock collar. The slideable hinge lock collar is preferably provided on the straight section and has a first state in which the first, second, third, and fourth spaced clevis pairs are exposed such that they can freely pivot, and a second state in which the first, second, third, and fourth spaced clevis pairs are covered by the slideable hinge lock collar such that they cannot pivot.

BRIEF DESCRIPTION OF THE DRAWINGS

FIG. 4a is a partial cross-sectional side view, and FIG. 4b is partial cross-sectional plan view, of the guide tube system of FIG. 3.

FIG. 10 illustrates the guide tube system of FIG. 3 in a folded state.

DETAILED DESCRIPTION

The present invention concerns a novel remote surveillance device. The following description is presented to enable one skilled in the art to make and use the invention, and is provided in the context of a particular application and its requirements. Various modifications to the preferred embodiment will be apparent to those skilled in the art, and the general principles set forth below may be applied to other embodiments and applications. Thus, the present invention is not intended to be limited to the embodiment shown.

Figure 1A:
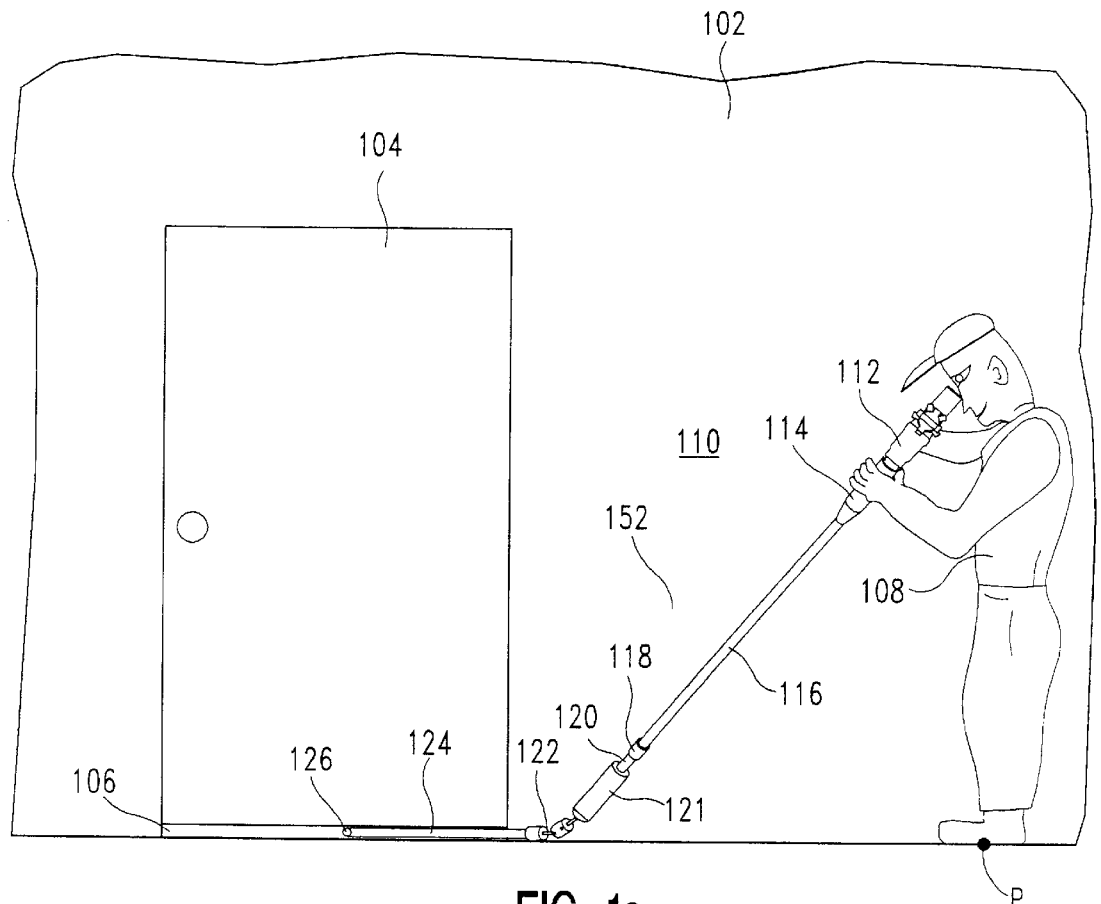
FIG. 1a is a side view.
Figure 1B:
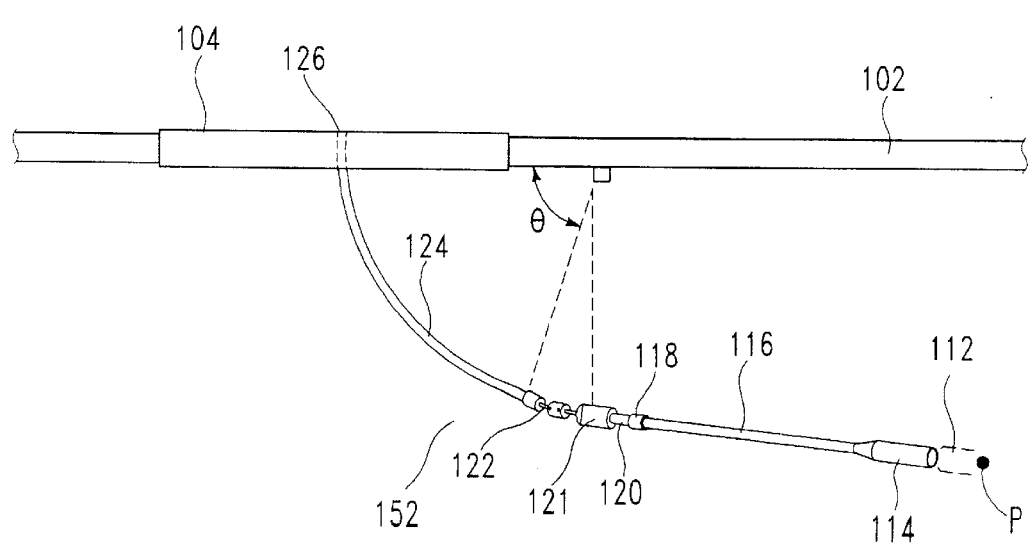
FIG. 1b is a plan view, illustrating the use of the remote surveillance system of the present invention for viewing an area behind a closed door.

FIG. 1a is a side view, and FIG. 1b is a plan view, illustrating the use of a preferred embodiment of the remote surveillance system of the present invention for viewing an area behind a closed door. Referring first to FIG. 1a, a law enforcement or military agent 108 wants to survey an area behind a wall 102 and a door 104. The agent 108 may use the remote surveillance system 110 of the present invention to survey the area via a space 106 between the floor and the bottom of the door 104.

The length of the insertion tube 204 of the fiberscope 200 is preferably sized such that its distal end extends slightly from the exit hole 126 of the guide tube system 152 when the guide tube system 152 is fully extended (i.e., when lower tube section 120 is telescoped to the maximum extent with respect to upper tube section 116). The extension of the insertion tube 204 from the exit hole 126 should be sufficient to permit up-down and left-right articulation of insertion tube 204 as discussed below (e.g., about a two (2) inch extension).

Basically, the remote surveillance system 110 includes a remote visual inspection system 112 (such as a flexible fiberscope, discussed below) and a guide tube system 152.

The visual inspection system 112 includes a body section (discussed below) coupled with a scope fitting section 114 of the guide tube system 152, and an insertion tube section (discussed below) which extends through an upper tube section 116, a length adjustment ring 118, a lower tube section 120, a slideable hinge lock collar 121, a double hinge system 122, and a curved tube section 124 of the guide tube system 152 such that a tip adapter at the distal end of the insertion tube is in an area of (e.g., extends about two (2) inches from) an exit hole 126 of the guide tube system 152.

The overall length of the guide tube system 152 can be adjusted. More specifically, the lower tube section 120 telescopes with respect to the upper tube section 116. The length adjustment ring 118 is used to permit the upper and lower tube sections 116 and 120, respectively, to move axially with respect to one another, or to lock the upper and lower tube sections 116 and 120, respectively, such that relative axial movement is prevented. To this end, the inner surface of the length adjustment ring 118 is threaded and provided with a collet and split ring. The threads of the length adjustment ring 118 mate with threads on the end of the upper tube section 116. When the adjustment ring is tightened, the split ring is pressed against the lower tube section 120 by the collet. In a preferred embodiment, the length of the guide tube system 152 is continuously adjustable from between about 40 inches and 60 inches. Since the length of the guide tube system 152 is adjustable, it may be used by users 108 of different heights. Further, when not in use, the lower tube section 116 can be slid into the upper tube section 120 thereby permitting easy storage and transport of the guide tube system 152.

As shown in FIG. 1b, the curved tube section 124 preferably has a bend angle θ of less than 90 degrees so that the operating position "P" of the user 108 is to the side of the door 104 yet slightly facing the door 104. Thus, the user 108 is not placed in a prone position in front of the door 106, yet is facing the door 104. In a preferred embodiment of the guide tube system 152 of the present invention, the curved tube section 124 has a 75 degree bend and a bend radius of about 7 inches. Further, the curved tube section 124 is preferably provided with a plastic shrink tube (or rubber or foam) to deaden any sounds between it and hard surfaces.

Figure 6A:
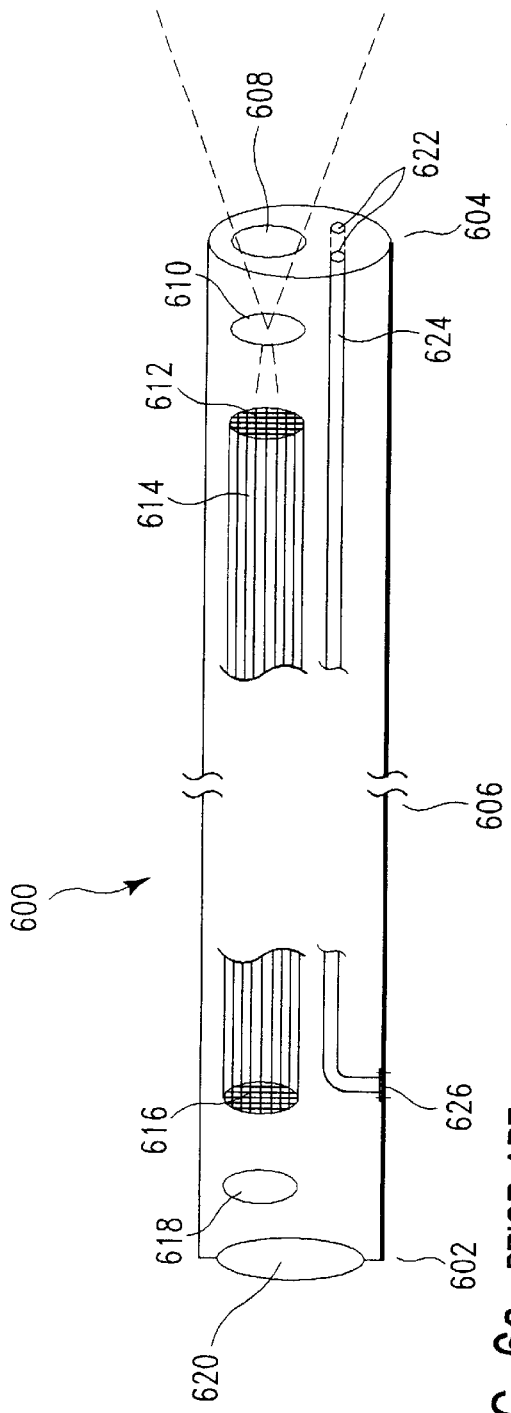
FIG. 6a is a high level, partial cross sectional side view of a conventional fiberscope.

As discussed above with reference to FIGS. 1a and 1b, the remote surveillance system 110 may include a flexible fiberscope sold by (such as an IF8C5-20 fiberscope sold by Olympus America, Inc. of Melville, N.Y.). Although the basic operating principles of flexible fiberscopes are known, they are briefly described here for the reader's convenience. FIG. 6a is a high level, partial cross sectional side view of a conventional fiberscope 600.

Basically, a flexible fiberscope 600 includes a proximal end 602, a distal end 604, and an insertion tube 606. At the distal end, a window 608 and objective lens system 610 focus an image of an object (not shown) within its field of view onto a distal end 612 of a bundle of optical fibers 614. The bundle of optical fibers 614 carries the focused image to its proximal end 616. At the proximal end 602, a lens system 618 focuses the image onto an eyepiece 620. In addition, an optical fiber bundle 624 can carry light from an external source (not shown), connected at port 626, to window(s) 622 at the distal end 604 of the flexible fiberscope 600 to illuminate objects (not shown) within the field of view of the lens 610.

In general, most fiberscopes have optical tip adapters at their distal end 604. As is known to those skilled in the art, different optical tips can be used at the distal end 604 to provide different f-Stops, different directions-of-view (or "DOVs"), different fields-of-view (or "FOVs"), different magnifications, different depths-of-field (or "DOFs"), and different focal points.

Figure 2A:
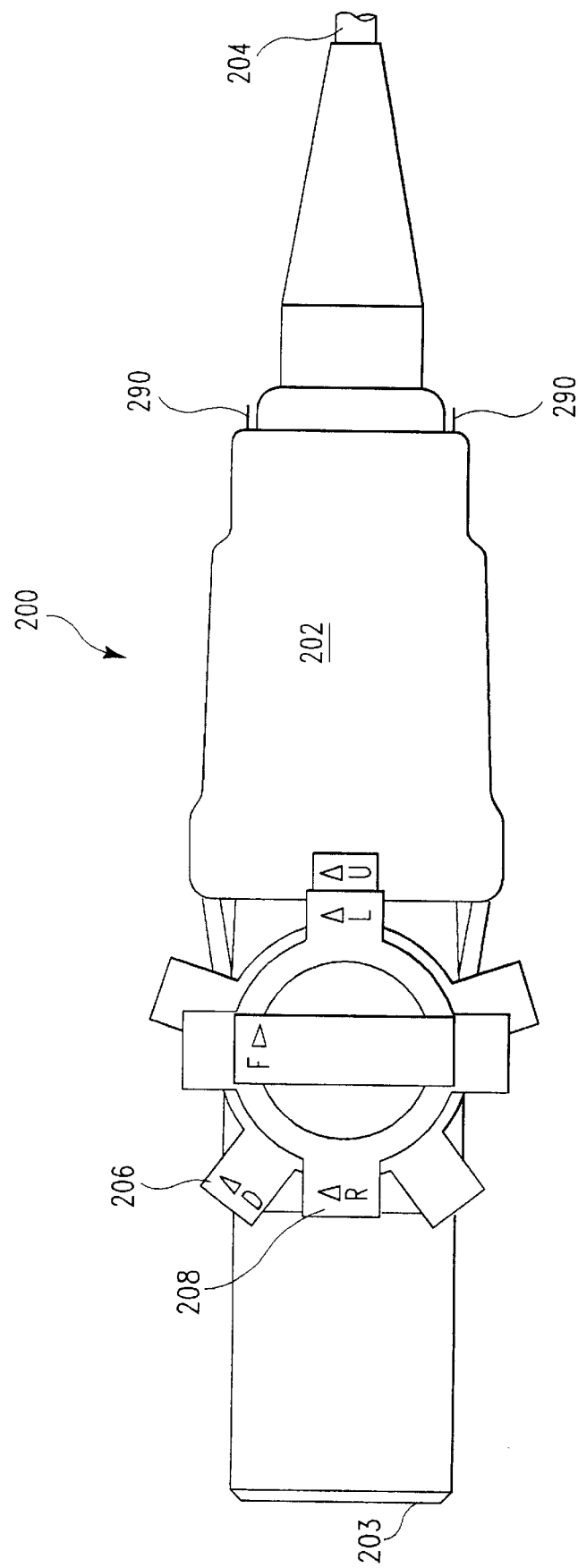
FIG. 2a is a side view.
Figures 2B, 2C:
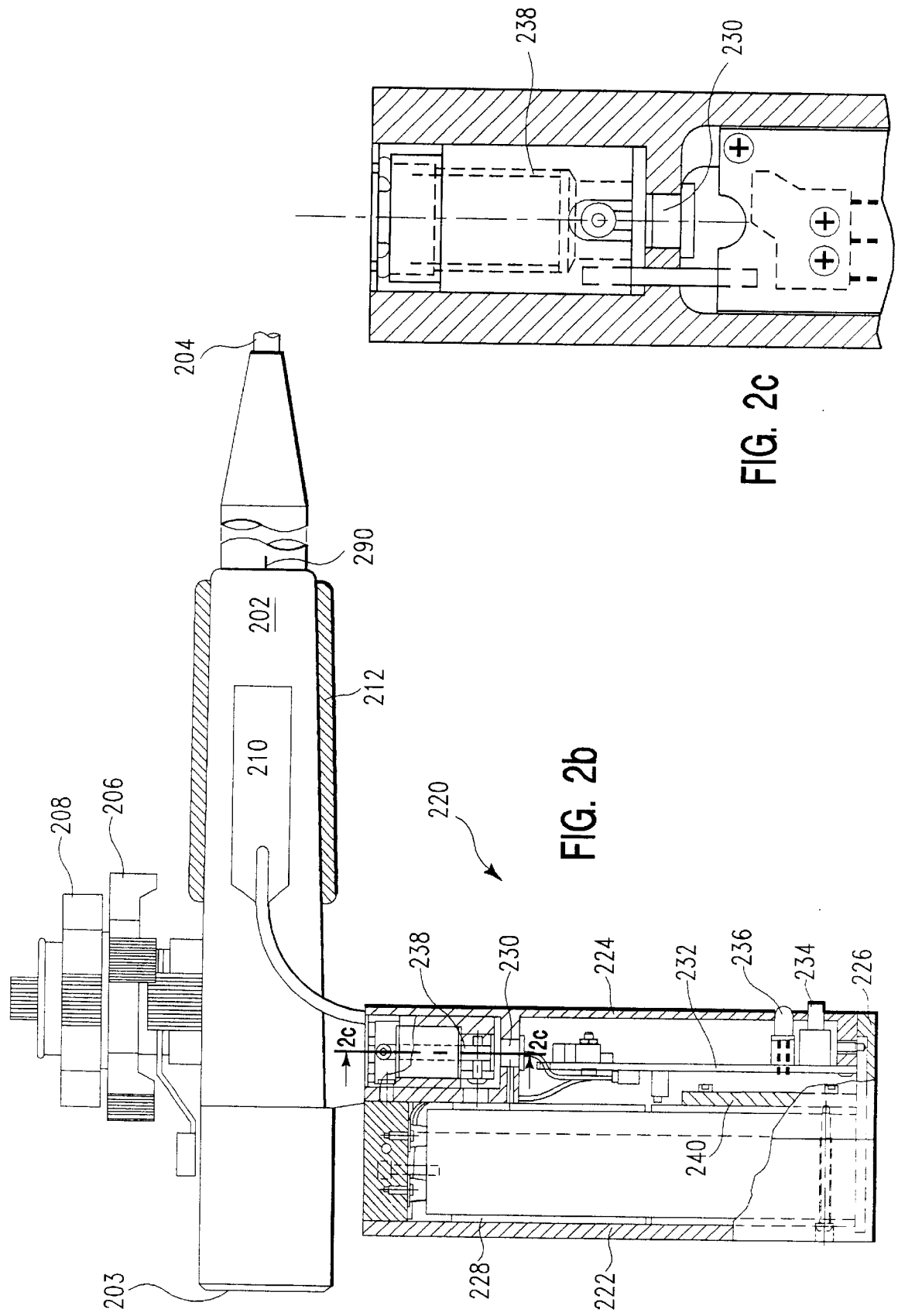
FIG. 2b is a partial cross-sectional plan view, of the body of a flexible fiberscope, equipped with a portable IR light source, which may be used with the remote surveillance system of the present invention.
FIG. 2c is a view taken along section A—A of FIG. 2b.

FIG. 2a is a side view, and FIG. 2b is a partial cross-sectional plan view, of the body 202 and a portion of the insertion tube 204 of a flexible fiberscope 200 which may be used with the remote surveillance system of the present invention. In a preferred embodiment of the present invention, the flexible fiberscope 200 may be a modified IF8C5-20 fiberscope sold by Olympus America, Inc. of Melville, N.Y. The modification includes a truncation of a light source connection and the provision of a portable infra-red (or "IR") light source 220. As shown in FIGS. 2a and 2b, the flexible fiberscope includes a body 202 and an insertion tube 204 (The insertion tube is not shown in its entirety.). The distal end (not shown) of the insertion tube 204 may be articulated up and down (e.g., at least 100° up and 100° down) with a first control knob 206 and left and right (e.g., at least 120° left and 120° right) with a second control knob 208. An eyepiece 203 is provided at the proximal end of the body 202. As will be discussed later, the eyepiece 203 may be fitted with a video adapter, a camera adapter, or an image intensifier (e.g., a night vision device). A diopter adjustment ring (not shown) is preferably provided to permit users having various eye-sights to use the remote surveillance system.

As shown in more detail in FIG. 2b, the portable IR light source 220 fixed to the flexible fiberscope 200 includes a rear enclosure 222, a front enclosure 224, left and right side enclosures (not shown) and a bottom slide 226. The bottom slide 226 may be opened to accept a battery holder 228 which, in a preferred embodiment, holds 4 "AA" batteries. The use of standard batteries enables easy access to replacement batteries in the field.

Within the enclosures of the IR light source 220, a printed circuit board 232 includes a switch 234, a two-stage indicator light 236, leads from an external pressure sensitive switch 210 (e.g., part no. 11598-11 sold by Laser Products), and an IR light emitting diode 230 (e.g., part no. SDL-5311-G1 sold by SDL Inc.). In a preferred embodiment, the IR LED 230 has an output power of 100 nW and peak output power in the 800 to 860 nm range. The printed circuit board further includes appropriate circuitry, known to those skilled in the art, to (i) place the indicator light 236 in a first on state when the switch 234 is closed but the pressure sensitive switch 210 is open, and (ii) turn on the IR LED 230 and place the indicator light 236 in a second on state when both the switch 234 and the pressure sensitive switch 210 are closed.

A fiber bundle adjustment sleeve 238 permits the proximal end of a fiber bundle (see e.g., element 624 of FIG. 6a.) to be moved with respect to the IR LED 230 such that an optical coupling between an end of the fiber bundle and the IR LED 230, which maximizes the amplitude of IR light provided to the fiber bundle, can be achieved. FIG. 2c is a view taken along section A—A of FIG. 2b which illustrates details of the IR LED 230 and the fiber bundle adjustment sleeve 238.

In an alternative embodiment, the pressure sensitive switch 210 may be a pressure sensitive device which outputs a signal based on the pressure applied. In this way, the intensity of the IR light can be continuously controlled based on the output of the pressure sensitive device.

The IR light source 220 also includes means (not shown) for disabling the IR LED 230 when the IR light source 220 is removed from the fiberscope body 202.

In an alternative embodiment (not shown), the IR light source 220 may be physically separated from the fiberscope body 202 but optically coupled with a light guide input of the fiberscope body 202 by means of a light guide. However, in such an embodiment, attenuation due to the light guide would reduce the net intensity of the light emitted by the fiberscope 200.

As is further shown in FIG. 2b, a foam grip 212 (e.g., part no. 444/03/3.01/.150 sold by Grab On) is provided around a section of the body 202 of the fiberscope and around the pressure sensitive switch 210. The IR LED 230 will not emit unless both the switch 234 and the pressure sensitive switch 210 are closed. The provision of the pressure sensitive switch 210 below the foam grip 212 is advantageous in that the batteries (not shown) held in the battery holder 228 and powering the IR LED 230 are conserved. The provision of the pressure sensitive switch 210 (as well as the two-stage light indicator 236) is further advantageous because it minimizes the risk of inadvertent exposure to IR radiation.

Figure 3:
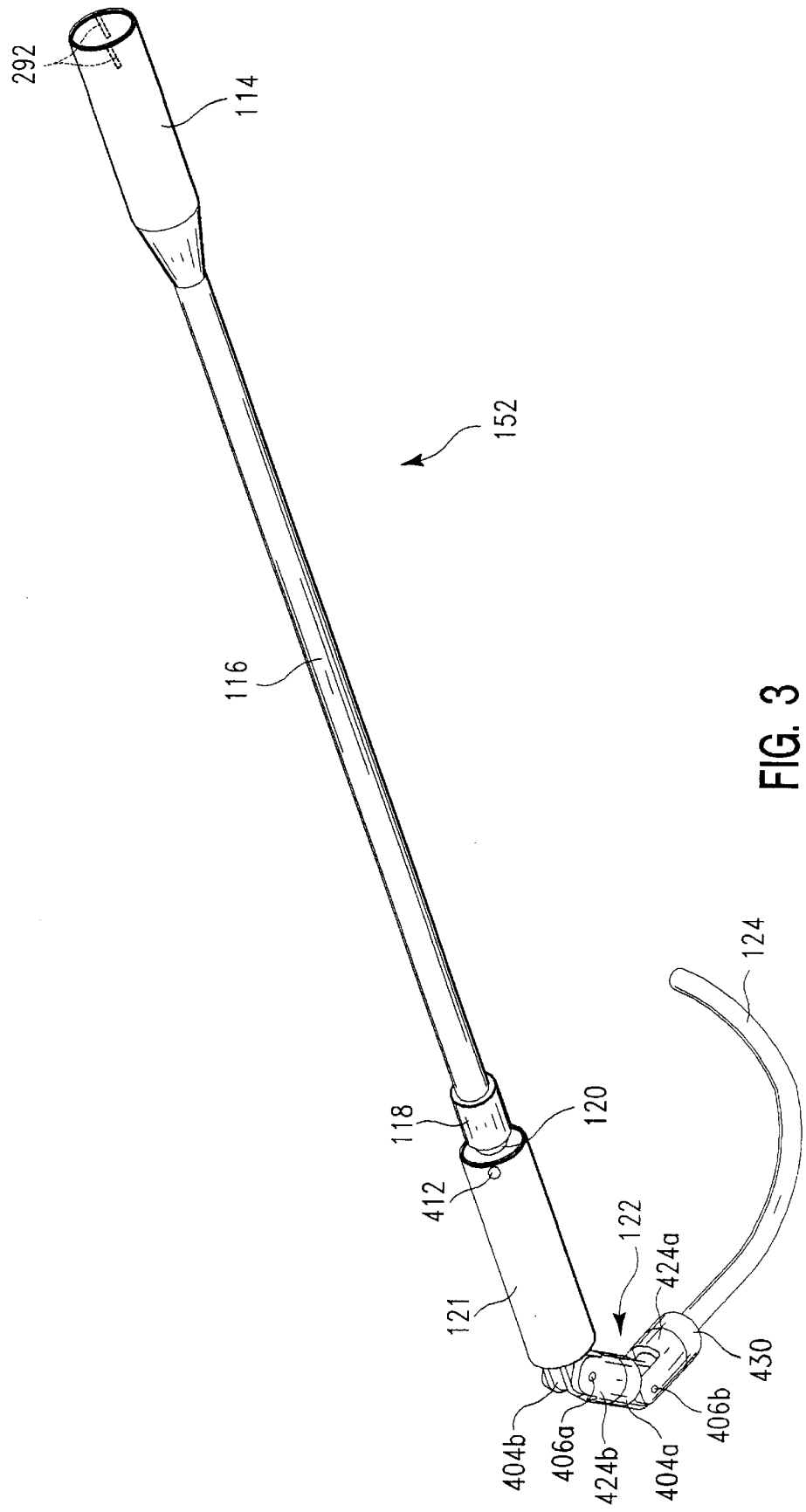
FIG. 3 is a perspective view of a guide tube system which may be used as a part of the remote surveillance system of the present invention.

The guide tube system 152 is now described referring to FIGS. 3, 4a, 4b, 5a, 5b and 9a–9c. FIG. 3 is a perspective view of a guide tube system 152 which may be used as a part of the remote surveillance system of the present invention. As shown in FIG. 3, and to reiterate the description of the guide tube system 152 set forth above with reference to FIGS. 1a and 1b, the guide tube system includes a scope fitting 114, an upper tube section 116, a length adjustment ring 118, a lower tube section 120, a double hinge system 122, a slideable hinge lock collar 121 and a curved tube section 124.

Figure 5A:
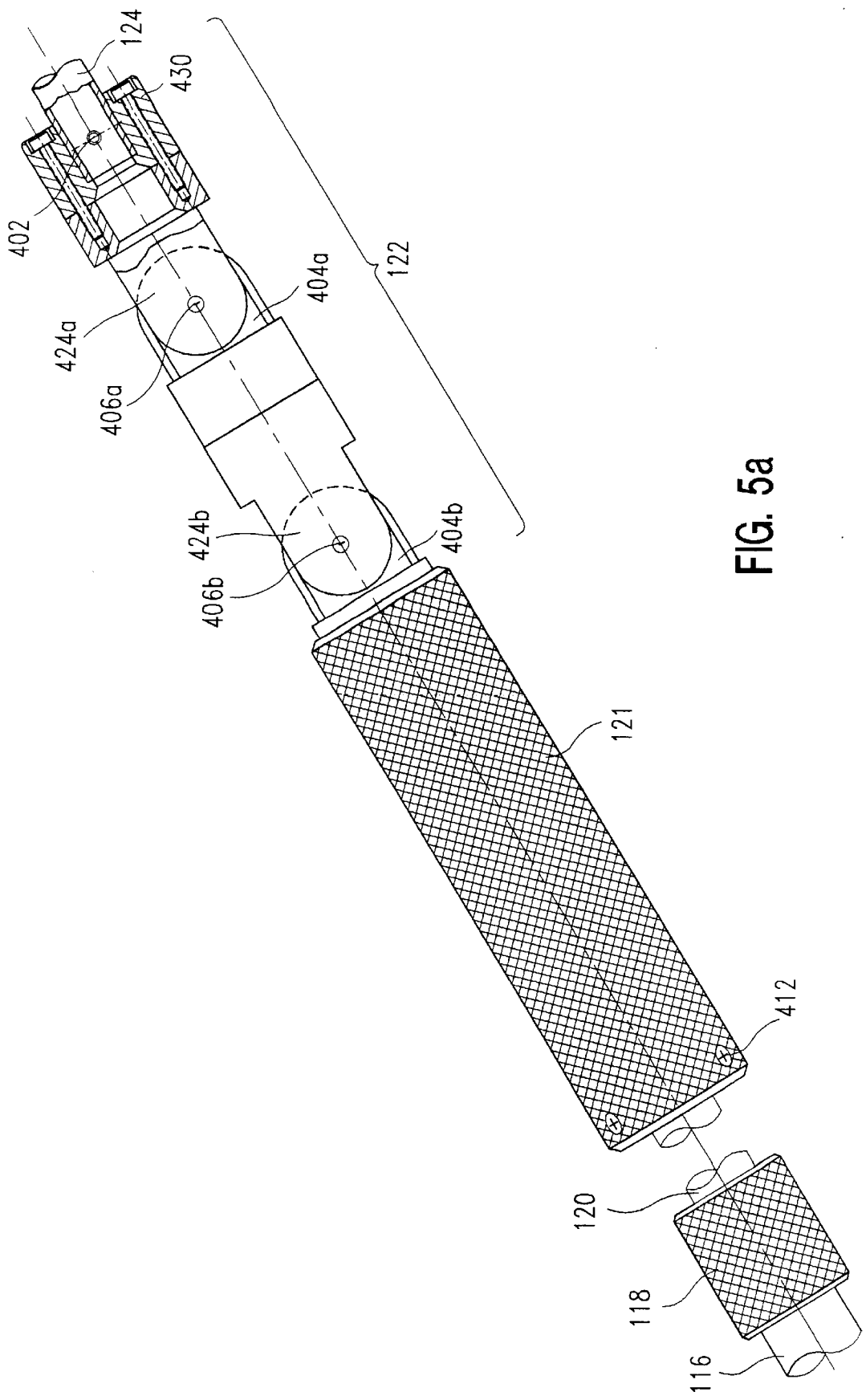
FIG. 5a is a partial cross-sectional plan view.
Figure 5B:
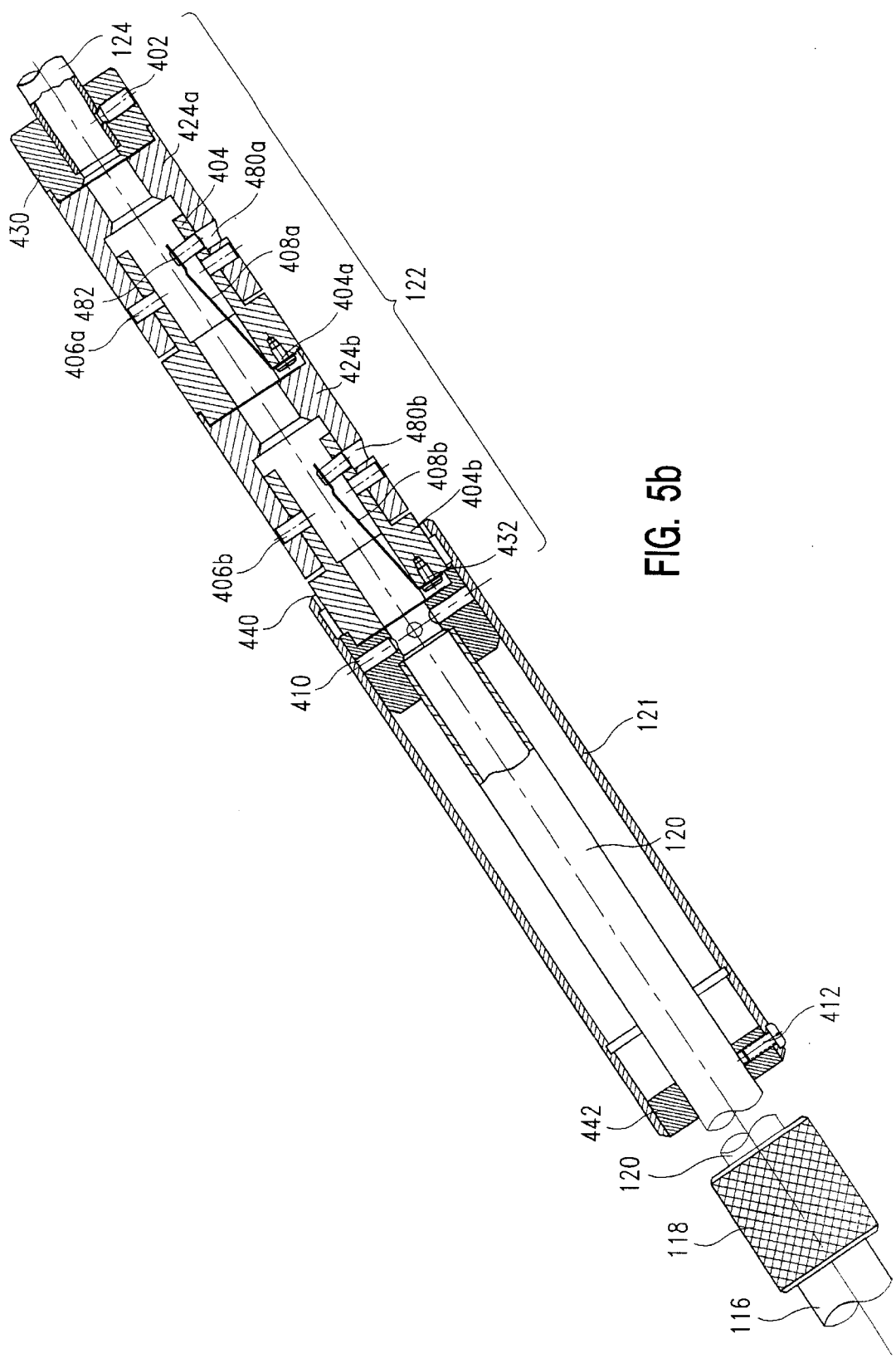
FIG. 5b is partial cross-sectional side view, of a hinged portion of the guide tube system of FIG. 3.

FIG. 4a is a partial cross-sectional side view, and FIG. 4b is partial cross-sectional plan view, of the guide tube 152 of FIG. 3. FIG. 5a is a partial cross-sectional plan view, and FIG. 5b is partial cross-sectional side view, of a hinged portion of the guide tube 152 of FIG. 3. As shown in FIGS. 3, 4a, 4b, 5a, and 5b, the double hinge system 122 includes a first female clevis (or wide spaced clevis) pair 424a coupled with the curved tube section 124. In a preferred embodiment, the first female clevis pair 424a is part of a universal mount 430 into which the curved tube section 124 is fixed by means of a set screw 402 and loctite. The first female clevis pair 424a is pivotally coupled with a first male clevis (or narrowly spaced clevis) pair 404a by means of dowel pins 406a. The first male clevis pair 404a is attached to a second female clevis pair 424b which is, in turn, pivotally coupled with a second male clevis pair 404b.

As shown in FIG. 5b, the second male clevis pair 404b is part of a universal mount 432. The universal mount 432 can slide along an inner cylindrical surface defined by the slideable hinge lock collar 121. The universal mount 432 has an outer diameter slightly larger than the width of the male clevis pairs 404 and female clevis pairs 424. An inwardly projecting lip 440 on a first end of the slideable hinge lock collar 121 and a stop 442 on a second end of the slideable hinge lock collar 121 contain and limit the axial translation of the universal mount 432 with respect to the slideable hinge lock collar 121. In a preferred embodiment of the present invention, the stop 442 is held within the slideable hinge lock collar 121 by means of a pan head screw 412 and loctite. A spring plunger 410 (or ball detent), biased radially outward, maintains the lateral (and radial) position of the universal mount 432 with respect to the slideable hinge lock collar 121 when no external sliding force is applied.

Figure 6B:
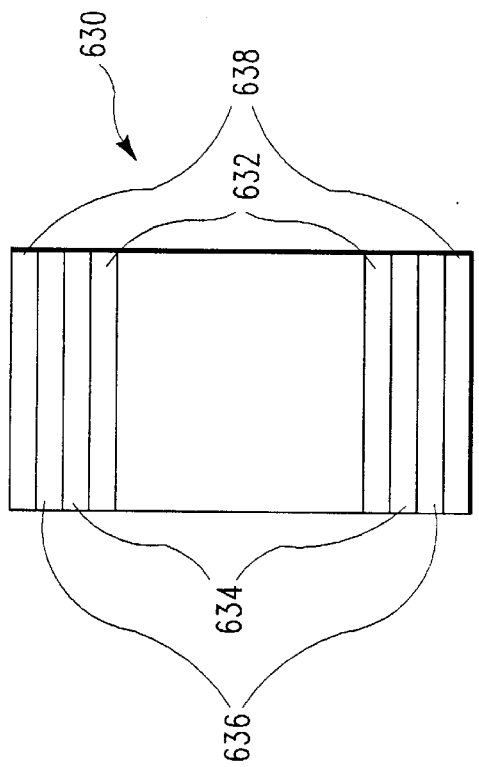
FIG. 6b is a cross-section of a wall section of a flexible insertion tube of a conventional fiberscope.

As discussed above, the remote surveillance system of the present invention should be resistant to extreme environmental conditions (i.e., it should be weatherproof). To this end, as shown in FIG. 6b, the insertion tube 204 of the fiberscope 200 used preferably has rugged, yet flexible four (4) layer walls. The inner most layer 632 is preferably made from a flexible stainless spring steel coil. The next layer 634 is preferably made from a stainless steel mesh. The next layer 636 is preferably a fluid resistant PVC layer. Although the layers 634 and 636 are shown as separate and distinct layers, the stainless steel mesh layer 634 is preferably incorporated into the PVC layer 636. Finally, an outer layer 638 is preferably a stainless steel mesh, impregnated with PTFE to prevent fraying. The PTFE also deadens noise when inserting the insertion tube 204 of the fiberscope 200 into the guide tube system 152.

Figure 9A:
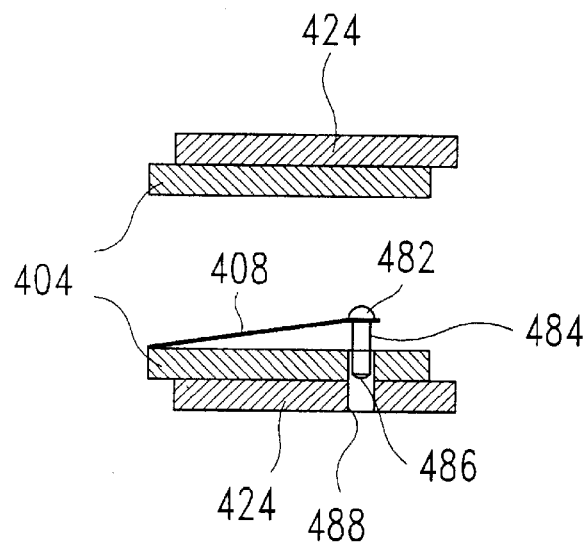
FIGS. 9a and 9c are cross-sectional plan views of a male-female clevis pairs when an insertion tube is not provided through the double hinge system and when an insertion tube is provided through the double hinge system, respectively.
Figure 9B:
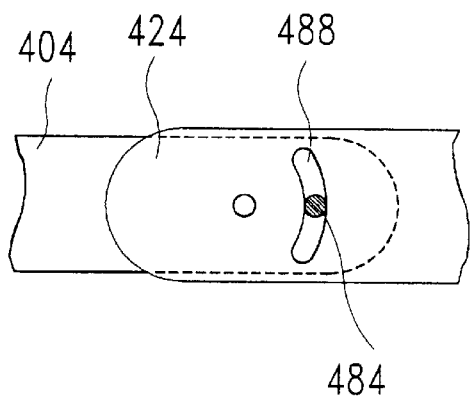
FIG. 9b is a side view of the male-female clevis pairs of FIGS. 9a and 9c.
Figure 9C:
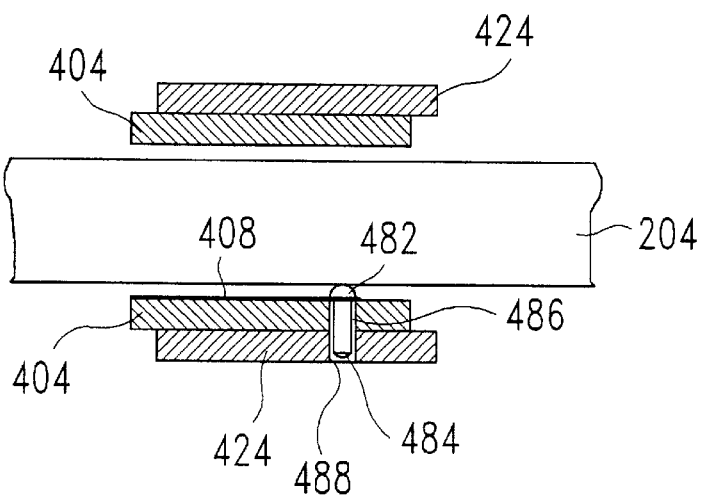

As discussed above, the distal end of the flexible insertion tube 204 may be articulated left-right and up-down. However, the bending radius of the flexible insertion tube 204 is limited. If the flexible insertion tube 204 is forcibly bent beyond a certain bending radius, it may be permanently damaged. Further, internal components such as the fiber bundle 614 or IR light guide 624 may be damaged and/or rendered temporarily inoperable. The double hinge system 122 of the guide tube system 152 is preferably designed to prevent extreme bending when the insertion tube of the flexible fiberscope is inserted, yet still permit extreme bending when the insertion tube is not inserted therein, to permit easy storage (See e.g., FIG. 10.). To this end, and referring to FIG. 5b and FIGS. 9a–9c, each of the male clevis pairs 404 is provided with a flat spring 408 and has a hole 486 defined therein. A spring stop 484 is preferably attached to the spring 408 by means of a pan head screw 482. As is further shown in the cross-sectional plan views of FIGS. 9a and 9c, and in the side view of FIG. 9b, each of the female clevis pairs is provided with a limiting slot 488. Thus, as shown in FIG. 9a, when the insertion tube 204 of the flexible fiberscope is not inserted through the double hinge system 122, the radially inward biased flat spring 408 holds the spring stop 484 such that it does not project into the limiting slot 488 of the female clevis pair 424. However, as shown in FIG. 9c, when the insertion tube 204 of the flexible fiberscope is inserted through the double hinge system 122, the insertion tube 204 forces the flat spring 408 radially outward such that the spring stop 484 projects into the limiting slot 488 of the female clevis pair 424. Accordingly, when the insertion tube 204 is inserted through the double hinge system 122, the bending radius of the insertion tube 204 is limited by the limiting slot 488 defined in each of the female clevis pairs 424. Although not shown, arced limiting grooves can be provided in the inside surface of the female clevis pairs 424 instead of the slots 488.

Axially fixing the insertion tube 204 with respect to the guide tube system 152 is advantageous because the operation of the up-down and left-right articulation control knobs 206 and 208, respectively, will produce consistent scanning motions. To this end, and referring to FIGS. 2a, 2b, and 3, the body 202 of the flexible fiberscope may be provided with one or more pins 290 which mate with pin holes 292 in the scope fitting section 114 of the guide tube system 152. Alternatively, the body 202 of the flexible fiberscope may be provided with one or more pins holes which mate with pins projecting from the scope fitting section 114 of the guide tube system 152. In yet another alternative embodiment, an elliptical (or another shape for prohibiting relative radial movement between the insertion tube 204 and the guide tube system 152) insertion tube 204 and guide tube system 152 may be provided. A friction fit is provided between an outer surface of the fiberscope body 202 and an inner surface of the scope fitting section 114. For example, an inner surface of the scope fitting section 114 may be provided with a groove having an o-ring and a plastic split-ring.

The scope fitting 114, upper tube section 116, the lower tube section 120, the length adjustment ring 118, and the slideable hinge lock collar 121 are preferably made of aluminum. The curved tube section 124 is preferably made of stainless steel and provided with a sound deadening plastic heat shrink tube. As shown in FIGS. 4a–5b, the outer surfaces of the scope fitting section 114, the length adjustment ring 120, and the slideable hinge lock collar 121 are preferably knurled to provide a sure grip. Finally, the guide tube system 152, as well as the distal end (including a tip adapter) of the insertion tube are blackened (e.g., hard coat anodized black) to minimize their visibility.

Various exemplary modes of operation of the remote surveillance system of the present invention are now set forth. Briefly stated, the flexible fiberscope 200 of FIGS. 2a and 2b, fit with an IR light source, can be used for surveillance of relatively dark areas without the tube guide system 152. Similarly, a rigid borescope (such as a series 5 borescope sold by Olympus America, Inc. of Melville, N.Y.), fit with an IR light source, can be used for surveillance of relatively dark areas. However, the use of the fiberscope and the guide tube system 152 confer many advantages. In addition, for surveillance of closed areas sufficiently lit, a flexible fiberscope without a light source (IR or other frequencies) can be used with the guide tube system 152. However, if the closed area to be surveyed is not well lit, use of the portable IR light source 220 is advantageous. Further, if the closed area to be surveyed is not well lit, a pocket intensifier (e.g., night vision device) may be fit onto the eyepiece 204 of the flexible fiberscope 200. For example, the "Dark Invader-Night Owl" pocket intensifier, sold by Meyers, and other pocket intensifiers sold by ITT Inc. or Litton Inc. may be used. A back focus lens system (such as part no. AI-3C sold by Olympus America, Inc. of Melville, N.Y.) may be used to fit the pocket intensifier (or a camera or video camera) to the eyepiece 203 of the fiberscope 200.

In the following operational examples, it will be assumed that a flexible fiberscope, having a portable IR light source, is used with the guide tube system 152 to survey a closed area from a space between a floor and a door bottom, and then, it will be assumed that the system is used to survey a closed area over a wall and under a ceiling tile. In both cases, it will be assumed that the area to be surveyed is relatively dark.

FIGS. 1a and 1b illustrate the use of the remote surveillance device 110 of the present invention to survey a closed area from a space 106 between a floor and a door 104. First, the insertion tube 204 of the flexible fiberscope 200 is snaked through the guide tube system 152 such that the distal end of the insertion tube 204 slightly extends (e.g., about two (2) inches) from the exit hole 126 at the end of the curved section 124 of the guide tube system 152. The pins 290 extending from the body 202 of the flexible fiberscope 200 mate with the pin holes 292 of the scope fitting section 114 of the guide tube system 152. As discussed above with respect to FIGS. 5b, 9a, 9b, and 9c, when the insertion tube 204 is snaked through the double hinge system 122 of the guide tube system 152, it forces the flat springs 408 of the male clevis pairs 404 radially outward such that the spring stops 484 project into the limiting slots 488 (or grooves) of the female clevis pairs 424 thereby preventing an extreme bending of the insertion tube 204 of the flexible fiberscope 200.

Next, as shown in FIG. 1a, the curved tube section 124 is laid flat on the floor such that the distal end of the insertion tube 204 projecting from the exit hole 126 of the curved tube section 124 extends into the space 106 between the floor and the bottom of the door 104. The length of the insertion tube 204 of the fiberscope 200 is preferably sized such that the distal end extends slightly (e.g., about two (2) inches) from the exit hole 126 of the guide tube system 152 when the guide tube system is fully extended (i.e., when lower tube section 120 is telescoped to the maximum extent with respect to upper tube section 116) such that left-right and up-down articulation of the distal and of the insertion tube 204 is permitted.

The user 108 can then adjust the length of the guide tube system 152 by unlocking the length adjustment ring 118, telescoping the upper and lower tube sections 116 and 120, respectively, and then locking the length adjustment ring 118.

Figure 8:
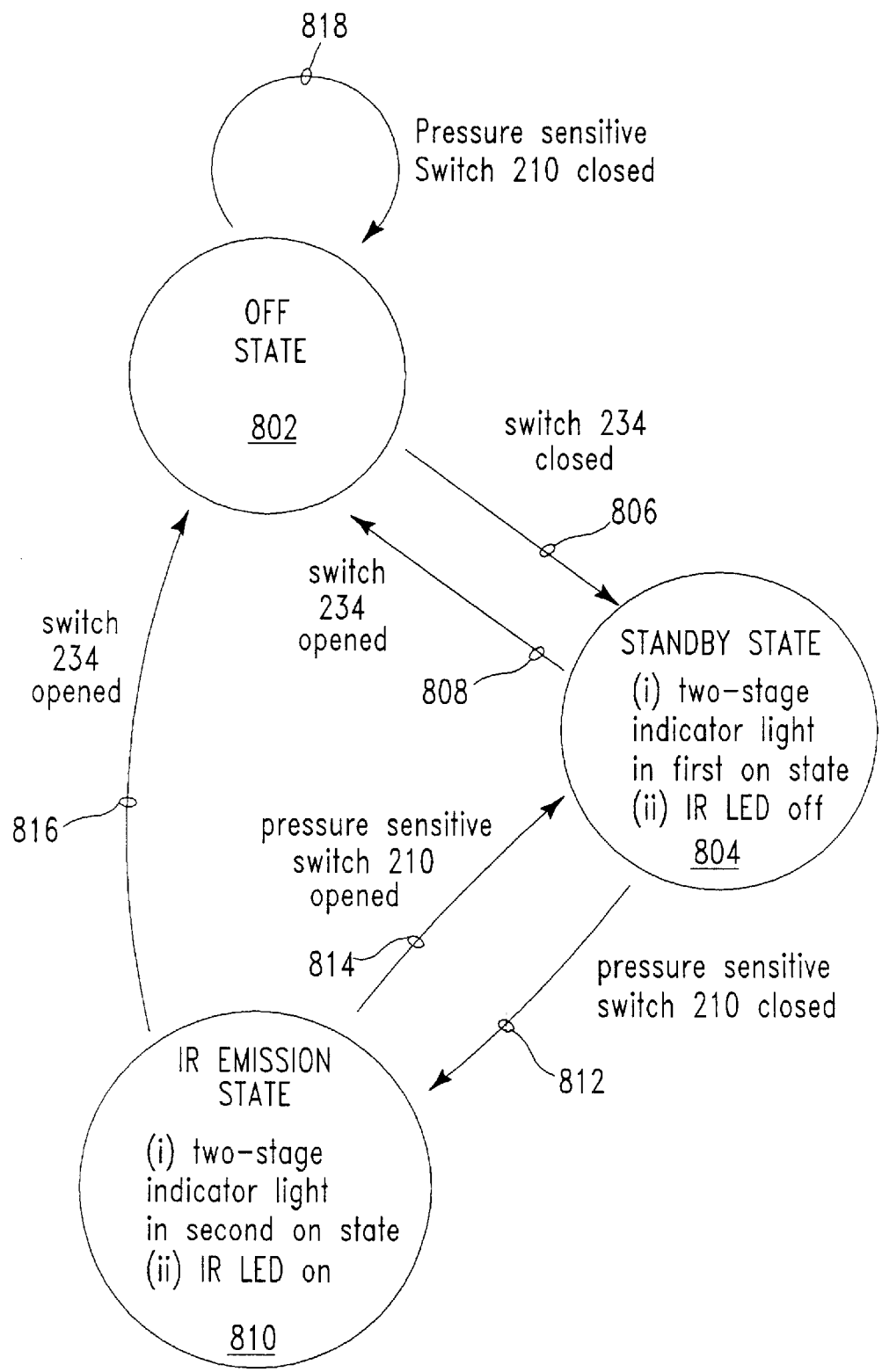
FIG. 8 is a state diagram for a portable IR light source used with the remote surveillance system of the present invention.

Referring to the state diagram of FIG. 8 of the portable, battery powered IR light source 220, the IR light source enters a standby state 804 from an off state 802 when the switch 234 is closed, as shown in transition 806. When in the standby state 804, the two stage indicator light 236 is in a first on state (e.g., in which it emits a green light). If the switch 234 is opened, operation returns to the off state 802, as shown in transition 808. From the standby state 804, when the user squeezes the foam grip 212 on the body 202 of the fiberscope, the pressure sensitive switch 210 is closed and the IR emission state 810 is entered, as shown in transition 812. In the IR emission state 810, the two-state indicator light 236 is in a second on state (e.g., in which it emits a red light). Moreover, the IR LED 230 emits IR light which is carried, via light guide 624, to window(s) 622 at the distal end of the insertion tube. From the IR emission state 810, if the pressure sensitive switch 210 is opened, the standby state 804 is re-entered, as shown by transition 814. If, on the other hand, the switch 816 is opened, then the off state 802 is entered, as shown by transition 816. As shown in transition 818, nothing happens if the pressure sensitive switch 210 is closed when in the off state 802.

Figure 7:
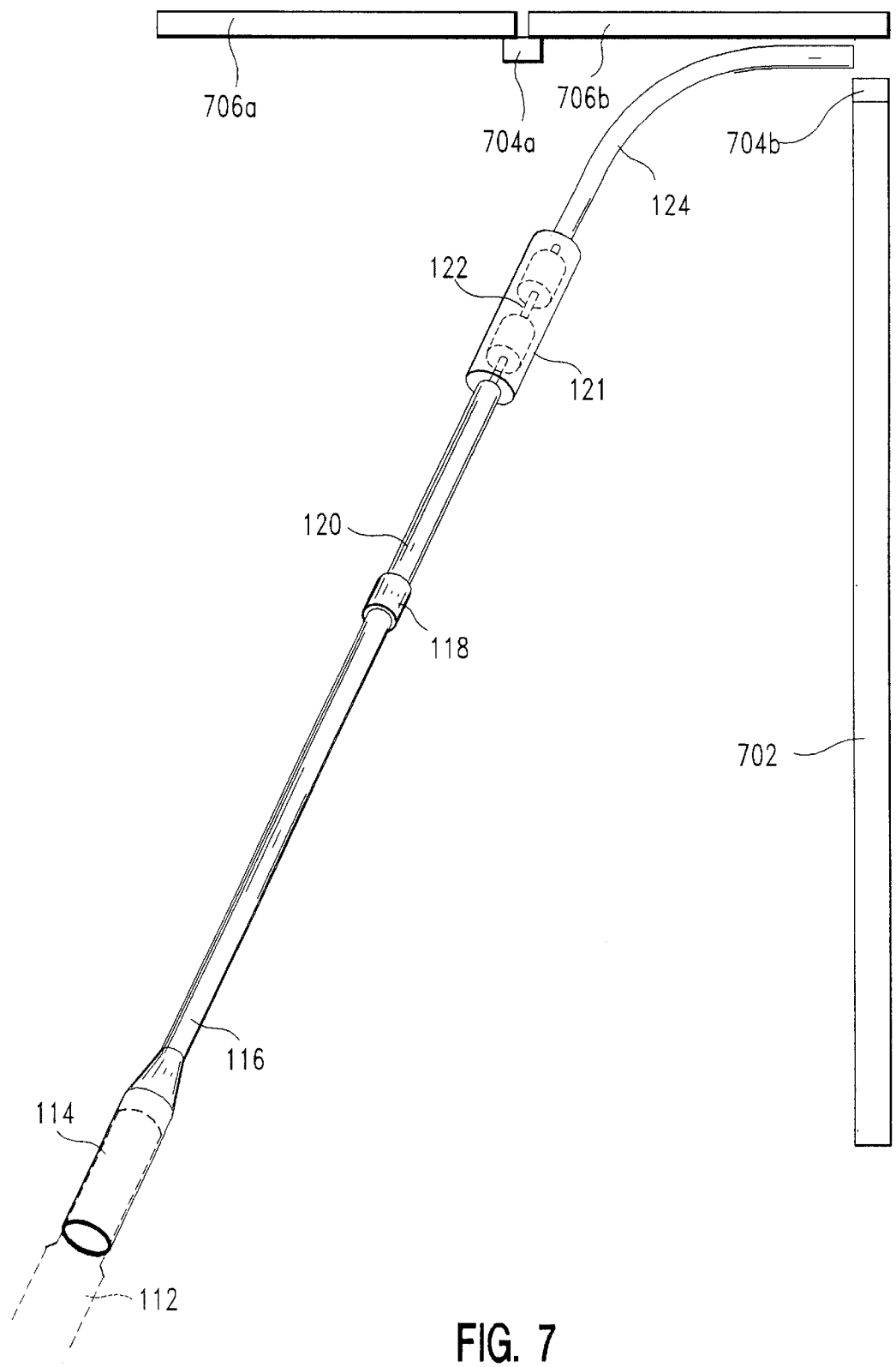
FIG. 7 illustrates the guide tube system of the present invention, for use in the remote surveillance system of the present invention, for surveying over a wall and under a ceiling tile.

Referring now to FIG. 7, the use of the remote surveillance system 110 to survey a closed (and relatively dark) area over a wall 702 and under a ceiling tile 706b is described. In such instances, the male-female clevis pairs 404, 424 of the double hinge system 122 should be fixed and the curved tube section 124 should remain erect. Referring to FIG. 5b, this is achieved by sliding the slideable hinge lock collar 121 over the double hinge system 122 until the universal mount 432 abuts the stop 442. The spring plunger 410 maintains the position of the slideable hinge lock collar 121 with respect to the universal mount 432. As shown in FIG. 7, the slideable hinge lock collar 121 now fixes the state of the double hinge system 122. In instances in which ceiling tiles 706 are held in tracks 704, the tube guide system 152 can be used to push up the ceiling tile from a track (See e.g., ceiling tile 706b and track 704b of FIG. 7.). In any event, the remote surveillance system of the present invention may be used to view an area beyond the wall 702.

In an alternative remote surveillance system, a videoimagescope, having a flexible insertion tube, may be used in place of the flexible fiberscope. Basically, a videoimagescope has a charge coupled device (or "CCD") at a distal end, upon which an image is focused. An electrical signal, based on the sequence charges clocked out from rows and columns of the elements of the CCD, is provided to a proximal end of the videoimagescope where a video display is provided. Such a videoimagescope may be, for example, part no. IV6C5, IV8D5/S5, IV12D4, or IV20D4X1-60, sold by Olympus America Inc. of Melville, N.Y., modified to include a portable IR light source and to remove an IR filter between the CCD and the image.

Thus, the present invention provides a remote surveillance system having many advantages. To summarize, the guide tube system 152 positions a user away from, yet slightly facing a door to an area to be surveyed. The telescoping tube sections, as well as the double hinge system, permit ergonomic use by users of various heights. The black finish of the guide tube system 152, as well as of the tip adapter at the distal end of the insertion tube 204 and the sound deadening coating on the curved tube section 124 facilitate stealthy operation. The portable IR light source and/or the pocket intensifier permit relatively dark areas to be surveyed. The left-right and up-down articulation facilitates a relatively detailed survey. No tools are required to operate the remote surveillance system. The double hinge system 122 and telescoping upper and lower tube sections 116 and 120, respectively, permit the guide tube assembly to be easily carried and stored when not in use.

What is claimed is:

1. A remote surveillance system for surveying a relatively dark area, the system comprising:
   a) an imaging device having
      i) a body, the body having a viewing means, and
      ii) an insertion tube, the insertion tube having a proximal end connected to the body and a distal end, the distal end of the insertion tube having
         A) means for capturing an image within a field of view, wherein the image captured by the means for capturing is conveyed to the viewing means of the body, and
         B) an illumination window; and
   b) an infra-red light source, the infra-red light source
      i) providing infra-red light in response to a user control, and
      ii) optically coupled with the body of the imaging device,
   wherein, infra-red light provided by the infra-red light source in response to the user control is carried from the proximal end of the insertion tube to the illumination window at the distal end of the insertion tube.

2. The remote surveillance system of claim 1 further comprising:
   c) an image intensifier optically coupled with the viewing means of the body of the imaging device.

3. The remote surveillance system of claim 2 wherein the image intensifier is a night vision unit.

4. The remote surveillance system of claim 1 wherein the body of the imaging device further includes articulation controls for articulating the distal end of the insertion tube.

5. The remote surveillance system of claim 4 wherein the articulation controls control up-down and left-right articulations of the distal end of the insertion tube.

6. The remote surveillance system of claim 1 wherein the imaging device is selected from a group consisting of a borescope, a fiberscope, and a videoimagescope.

7. The remote surveillance system of claim 1 further comprising:
   c) a pressure sensitive switch, providing an output to the infra-red light source,
      wherein, the user control is based, at least in part, on a state of the pressure sensitive switch.

8. The remote surveillance system of claim 7 wherein the pressure sensitive switch is provided on the body of the imaging device.

9. The remote surveillance system of claim 1 wherein the infra-red light source includes
   i) a removable power supply,
   ii) an on-off switch, wherein the user control is based, at least in part, on a state of the on-off switch, and
   iii) an infra-red light emitting diode which provides the infra-red light in response to the user control.

10. The remote surveillance system of claim 9 wherein the removable power supply includes at least one DC battery.

11. The remote surveillance system of claim 1 further comprising:
    c) a pressure sensitive switch providing an output to the infra-red light source,
    wherein, the infra-red light source includes
       i) a removable power supply,
       ii) an on-off switch, and
       iii) an infra-red light emitting diode which provides the infra-red light in response to the user control, and
    wherein the user control is based on a state of the pressure sensitive switch and a state of the on-off switch.

12. The remote surveillance system of claim 11 wherein the infra-red light source only provides infra-red light when both the on-off switch and the pressure sensitive switch are closed.

13. The remote surveillance system of claim 11 wherein the infra-red light source further includes an indicator light having a first on state and a second on state, wherein the indicator light enters the first on state when the on-off switch is closed but the pressure sensitive switch is open, and enters the second on state when both the on-off switch and the pressure sensitive switch are closed.

14. The remote surveillance system of claim 11 wherein the pressure sensitive switch is provided on the body of the imaging device.

15. The remote surveillance system of claim 14 further comprising a foam grip provided on the body of the imaging device, wherein the pressure sensitive switch is arranged between a portion of the foam grip and the body of the imaging device.

16. A remote surveillance system comprising:
    a) an imaging device having
       i) a body, the body having a viewing means, and
       ii) an insertion tube, the insertion tube having a proximal end connected to the body and a distal end, the distal end of the insertion tube having means for capturing an image within a field of view, wherein the image captured by the means for capturing is conveyed to the viewing means of the body; and
    b) an insertion tube guide, the insertion tube guide including
       i) a straight section having an entrance port for receiving the insertion tube of the imaging device,
       ii) a curved section, coupled with the straight section, having an exit port through which a distal end of the insertion tube exits, and
       iii) a hinged section, arranged between the straight section and the curved section, for pivotally coupling the straight section and curved section.

17. The remote surveillance system of claim 16 wherein the hinged section of the insertion tube guide includes means for limiting, when the insertion tube is inserted therethrough, the pivoting of the straight section with respect to the curved section.

18. The remote surveillance system of claim 16 wherein the hinged section of the insertion tube guide includes
    A) a first spaced clevis pair, coupled with the straight section of the insertion tube guide,
    B) a member including 1) a second spaced clevis pair, pivotally coupled with the first spaced clevis pair, and
2) a third spaced clevis pair, coupled with the second spaced clevis pair, and
C) a fourth spaced clevis pair, pivotally coupled with the third spaced clevis pair, and coupled with the curved section of the insertion tube guide,
wherein, each of the first, second, third, and fourth spaced clevis pairs are spaced such that the insertion tube of the imaging device can pass therethrough.

19. The remote surveillance system of claim 18, wherein the insertion tube guide further includes
    iv) a slideable hinge lock collar provided on the straight section and having a first state in which the first, second, third, and fourth spaced clevis pairs are exposed such that they can freely pivot, and having a second state in which the first, second, third, and fourth spaced clevis pairs are covered by the slideable hinge lock collar such that they cannot pivot.

20. A remote surveillance system comprising:
    a) an imaging device having
        i) a body, the body having a viewing means, and
        ii) an insertion tube, the insertion tube having a proximal end connected to the body and a distal end, the distal end of the insertion tube having means for capturing an image within a field of view, wherein the image captured by the means for capturing is conveyed to the viewing means of the body; and
    b) an insertion tube guide, the insertion tube guide including
        i) a straight section having an entrance port for receiving the insertion tube of the imaging device, and
        ii) a curved section, coupled with the straight section, having an exit port through which a distal end of the insertion tube exits,
    wherein the straight section of the insertion tube guide includes
        A) a fitting for receiving a portion of the body of the imaging device,
        B) an upper section coupled with the fitting,
        C) a lower section, wherein the lower section can telescope with respect to the upper section.

21. The remote surveillance system of claim 20 wherein the straight section of the insertion tube guide further includes a length adjustment ring for enabling and disabling the telescoping between the upper and lower sections.

22. The remote surveillance system of claim 20 wherein the fitting of the straight section of the insertion tube guide and the body of the imaging device include means for preventing relative radial movement between the imaging device and the insertion tube guide.

23. A remote surveillance system comprising:
    a) an imaging device having
        i) a body, the body having a viewing means, and
        ii) an insertion tube, the insertion tube having a proximal end connected to the body and a distal end, the distal end of the insertion tube having means for capturing an image within a field of view, wherein the image captured by the means for capturing is conveyed to the viewing means of the body; and
    b) an insertion tube guide, the insertion tube guide including
        i) a straight section having an entrance port for receiving the insertion tube of the imaging device, and
        ii) a curved section, coupled with the straight section, having an exit port through which a distal end of the insertion tube exits,
    wherein the curved section of the insertion tube guide is provided with means for deadening noise.

24. A remote surveillance system comprising:
    a) an imaging device having
        i) a body, the body having a viewing means, and
        ii) an insertion tube, the insertion tube having a proximal end connected to the body and a distal end, the distal end of the insertion tube having means for capturing an image within a field of view, wherein the image captured by the means for capturing is conveyed to the viewing means of the body; and
    b) an insertion tube guide, the insertion tube guide including
        i) a straight section having an entrance port for receiving the insertion tube of the imaging device, and
        ii) a curved section, coupled with the straight section, having an exit port through which a distal end of the insertion tube exits,
    wherein the distal end of the insertion tube and the insertion tube guide are both black.

25. A remote surveillance system comprising:
    a) an imaging device having
        i) a body, the body having a viewing means, and
        ii) an insertion tube, the insertion tube having a proximal end connected to the body and a distal end, the distal end of the insertion tube having means for capturing an image within a field of view, wherein the image captured by the means for capturing is conveyed to the viewing means of the body;
    b) an insertion tube guide, the insertion tube guide including
        i) a straight section having an entrance port for receiving the insertion tube of the imaging device, and
        ii) a curved section, coupled with the straight section, having an exit port through which a distal end of the insertion tube exits; and
    c) an image intensifier optically coupled with the viewing means of the body.

26. The remote surveillance system of claim 25 wherein the image intensifier is a night vision unit.

27. A remote surveillance system comprising:
    a) an imaging device having
        i) a body, the body having a viewing means, and
        ii) an insertion tube, the insertion tube having a proximal end connected to the body and a distal end, the distal end of the insertion tube having means for capturing an image within a field of view, wherein the image captured by the means for capturing is conveyed to the viewing means of the body; and
    b) an insertion tube guide, the insertion tube guide including
        i) a straight section having an entrance port for receiving the insertion tube of the imaging device, and
        ii) a curved section, coupled with the straight section, having an exit port through which a distal end of the insertion tube exits,
    wherein the body of the imaging device further includes articulation controls for articulating the distal end of the insertion tube.

28. The remote surveillance system of claim 27 wherein the articulation controls control up-down and left-right articulations of the distal end of the insertion tube.

29. A remote surveillance system comprising:
    a) an imaging device having
        i) a body, the body having a viewing means, and ii) an insertion tube, the insertion tube having a proximal end connected to the body and a distal end, the distal end of the insertion tube having means for capturing an image within a field of view, wherein the image captured by the means for capturing is conveyed to the viewing means of the body;

b) an insertion tube guide, the insertion tube guide including i) a straight section having an entrance port for receiving the insertion tube of the imaging device, and ii) a curved section, coupled with the straight section, having an exit port through which a distal end of the insertion tube exits; and c) an infra-red light source, the infra-red light source i) providing infra-red light in response to a user control, and ii) optically coupled with the body of the imaging device, wherein, infra-red light provided by the infra-red light source in response to the user control is carried from the proximal end of the insertion tube to an illumination window at the distal end of the insertion tube.

30. The remote surveillance system of claim 29 further comprising:

d) a pressure sensitive switch, providing an output to the infra-red light source, wherein, the user control is based, at least in part, on a state of the pressure sensitive switch.

31. The remote surveillance system of claim 30 wherein the pressure sensitive switch is provided on the body of the imaging device.

32. The remote surveillance system of claim 29 wherein the infra-red light source includes i) a removable power supply, ii) an on-off switch, wherein the user control is based, at least in part, on a state of the on-off switch, and iii) an infra-red light emitting diode which provides the infra-red light in response to the user control.

33. The remote surveillance system of claim 32 wherein the removable power supply includes at least one DC battery.

34. The remote surveillance system of claim 29 further comprising:

d) a pressure sensitive switch providing an output to the infra-red light source, wherein, the infra-red light source includes i) a removable power supply, ii) an on-off switch, and iii) an infra-red light emitting diode which provides the infra-red light in response to the user control, and wherein the user control is based on a state of the pressure sensitive switch and a state of the on-off switch.

35. The remote surveillance system of claim 34 wherein the infra-red light source only provides infra-red light when both the on-off switch and the pressure sensitive switch are closed.

36. The remote surveillance system of claim 34 wherein the infra-red light source further includes an indicator light having a first on state and a second on state, wherein the indicator light enters the first on state when the on-off switch is closed but the pressure sensitive switch is open, and enters the second on state when both the on-off switch and the pressure sensitive switch are closed.

37. The remote surveillance system of claim 34 wherein the pressure sensitive switch is provided on the body of the imaging device.

38. The remote surveillance system of claim 37 further comprising:

e) a foam grip provided on the body of the imaging device, wherein the pressure sensitive switch is arranged between a portion of the foam grip and the body of the imaging device.

39. An insertion tube guide for receiving an insertion tube of an imaging device, the insertion tube having a distal end having means for capturing an image within a field of view, wherein the image captured by the means for capturing is conveyed to a viewing means of the imaging device, the insertion tube guide comprising:

a) a straight section having an entrance port for receiving the insertion tube of the imaging device;

b) a curved section, coupled with the straight section, having an exit port through which the distal end of the insertion tube exits; and c) a hinged section, arranged between the straight section and the curved section, for pivotally coupling the straight section and curved section.

40. The insertion tube guide of claim 39 wherein the hinged section includes means for limiting, when the insertion tube is inserted therethrough, the pivoting of the straight section with respect to the curved section.

41. The insertion tube guide of claim 39 wherein the hinged section includes i) a first spaced clevis pair, coupled with the straight section of the insertion tube guide, ii) a member including A) a second spaced clevis pair, pivotally coupled with the first spaced clevis pair, and B) a third spaced clevis pair, coupled with the second spaced clevis pair, and iii) a fourth spaced clevis pair, pivotally coupled with the third spaced clevis pair, and coupled with the curved section of the insertion tube guide, wherein, each of the first, second, third, and fourth spaced clevis pairs are spaced such that the insertion tube of the imaging device can pass therethrough.

42. The insertion tube guide of claim 41 further comprising:

d) a slideable hinge lock collar provided on the straight section and having a first state in which the first, second, third, and fourth spaced clevis pairs are exposed such that they can freely pivot, having a second state in which the first, second, third, and fourth spaced clevis pairs are covered by the slideable hinge lock collar such that they cannot pivot.

43. An insertion tube guide for receiving an insertion tube of an imaging device, the insertion tube having a distal end having means for capturing an image within a field of view, wherein the image captured by the means for capturing is conveyed to a viewing means of the imaging device, the insertion tube guide comprising:

a) a straight section having an entrance port for receiving the insertion tube of the imaging device; and b) a curved section, coupled with the straight section, having an exit port through which the distal end of the insertion tube exits, wherein the straight section of the insertion tube guide includes i) a fitting for receiving a portion of the imaging device, ii) an upper section coupled with the fitting, iii) a lower section, wherein the lower section can telescope with respect to the upper section.

44. The insertion tube guide of claim 43 wherein the straight section of the insertion tube guide further includes a length adjustment ring for enabling and disabling the telescoping between the upper and lower sections.

45. The insertion tube guide of claim 43 wherein the fitting of the straight section of the insertion tube guide includes means for preventing relative radial movement between the imaging device and the insertion tube guide.

46. An insertion tube guide for receiving an insertion tube of an imaging device, the insertion tube having a distal end having means for capturing an image within a field of view, wherein the image captured by the means for capturing is conveyed to a viewing means of the imaging device, the insertion tube guide comprising:

a) a straight section having an entrance port for receiving the insertion tube of the imaging device; and b) a curved section, coupled with the straight section, having an exit port through which the distal end of the insertion tube exits, wherein the curved section of the insertion tube guide is provided with means for deadening noise.

47. An insertion tube guide for receiving an insertion tube of an imaging device, the insertion tube having a distal end having means for capturing an image within a field of view, wherein the image captured by the means for capturing is conveyed to a viewing means of the imaging device, the insertion tube guide comprising:

a) a straight section having an entrance port for receiving the insertion tube of the imaging device; and b) a curved section, coupled with the straight section, having an exit port through which the distal end of the insertion tube exits, wherein the insertion tube guide is black.

* * * * *